United States Patent Office 3,447,930
Patented June 3, 1969

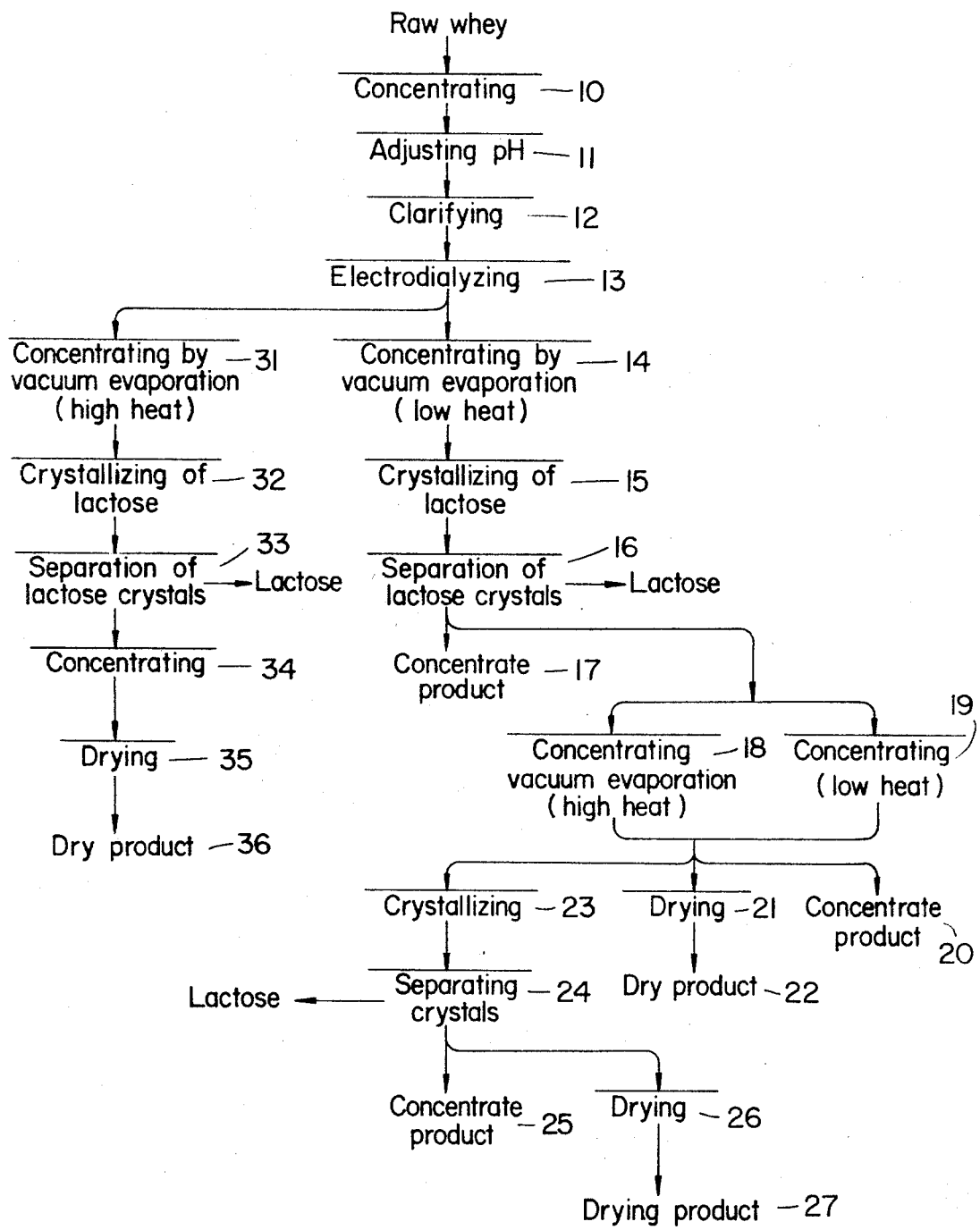
FIG_1

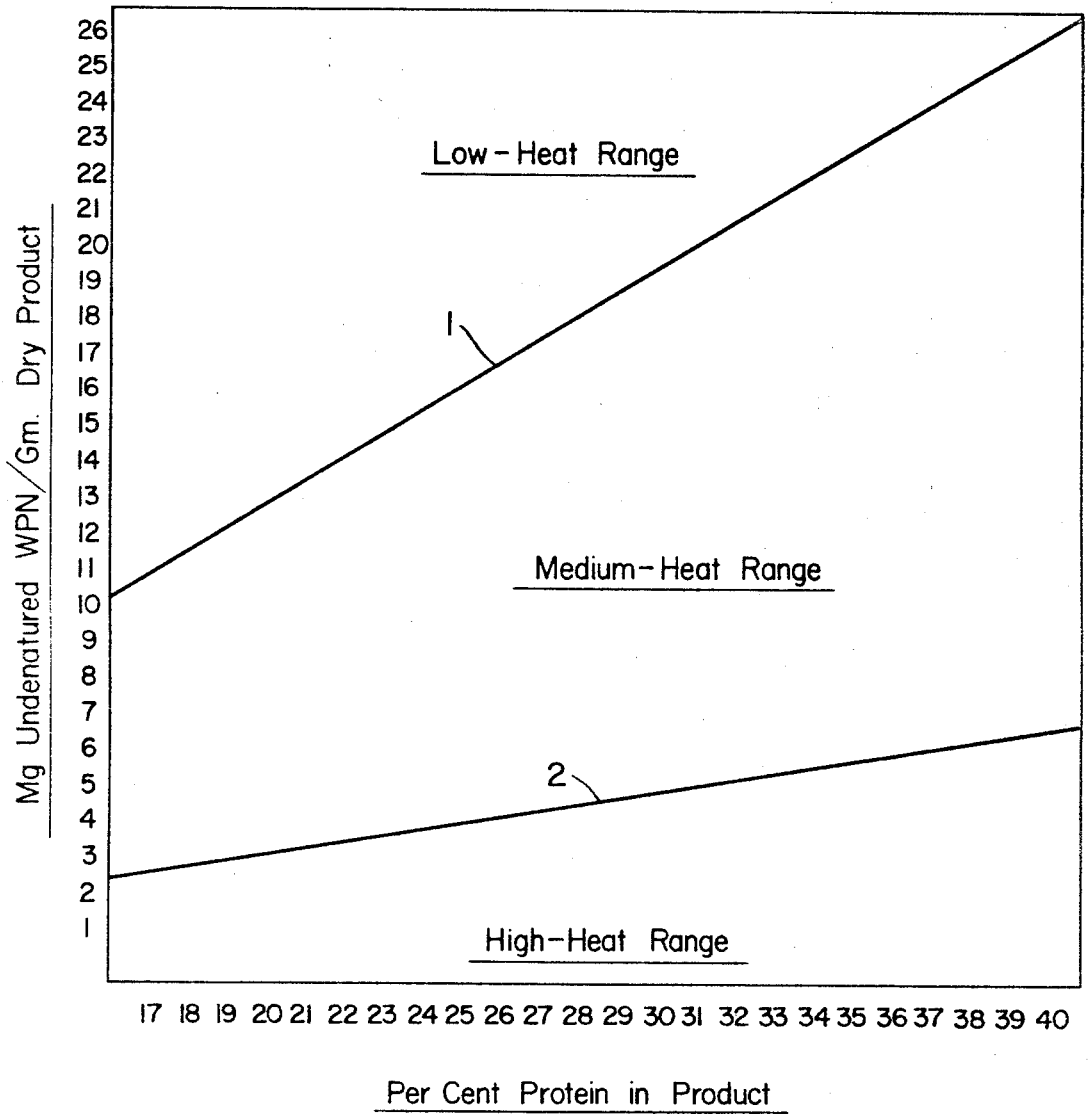
FIG_2

3,447,930
PROCESS OF TREATING WHEY
Leo H. Francis, Millbrae, Calif., assignor, by mesne assignments, to Foremost-McKesson, Inc., a corporation of Maryland
Filed Apr. 14, 1966, Ser. No. 542,538
Int. Cl. A23c *21/00;* B01d *13/02*
U.S. Cl. 99—57                                        8 Claims

ABSTRACT OF THE DISCLOSURE

Whey treatment process in which liquid having most of its protein in substantially undenatured form is concentrated without substantial denaturation of protein, clarified and then subjected to electrodialysis to reduce its ash content by about 15% or more. The demineralized whey is then concentrated and some lactose removed.

---

This invention relates generally to processes for the treatment of whey for the manufacture of products containing whey solids.

It is well known that liquid whey produced in various manufacturing processes contains valuable food constituents. The processing of such liquid whey to form edible food products involves a number of problems. The mineral salt content is higher than desired for normal food products, and imparts undesirable flavor characteristics. When such wheys are partially delactosed, they may contain nutritionally deleterious levels of salts of monovalent cations, particularly when used at otherwise desirable levels in foods. When it is attempted to reduce the mineral salt content of whey by conventional methods such as ion exchange resins or electrodialysis, various difficulties are encountered. Ion exchange resin columns tend to become clogged with insoluble precipitated protein. This requires frequent shutdown for cleaning, which greatly increases cost of operation. Electrodialysis has heretofore been applied to low heat wheys, and has been considered inapplicable to medium or high heat wheys due to difficulties caused by the amounts of denatured protein present. Production of a high heat whey product by electrodialysis has required heat treatment for denaturation of protein following electrodialysis of low heat whey. Electrodialysis likewise involves difficulties when applied either to the raw whey, or to whey concentrate. Application of electrodialysis to a whey concentrate affords a greater capacity for a given electrodialysis equipment, but requires means for controlling viscosity and tendency toward gel formation. Application of electrodialysis to liquid whey without previous concentration tends to minimize the problems of viscosity and gel formation, but as indicated above, the low concentration of solids in the raw whey limits capacities, particularly because of the high volume of liquid which must be passed through the electrodialyzing equipment and the relatively low conductivity of the unconcentrated whey.

In my copending application Ser. No. 480,068, filed Aug. 16, 1965 and now abandoned, I have disclosed a whey treatment process which involves removal of lactose from whey before demineralization, followed by demineralizing the resulting partially delactosed whey concentrate by electrodialysis. Such a process has been found applicable to both high heat and low heat wheys. However, there are some instances where it is desirable to apply electrodialysis to the liquid whey before removal of lactose, as for example where it is desired to carry out electrodialysis at or near the source of whey, and lactose removal at a separate plant location.

Previous reference has been made to low, medium and high heat wheys. These terms have reference to the extent to which the heat-denaturable whey protein is denatured by heat treatment. The heat-denaturable portion of whey is about 55% of the total whey protein. Heat treatment may involve temperatures ranging from 140–260° F. or higher for various effective holding times. A low heat whey may be defined as one having not more than about 20% of its heat-denaturable protein in denatured form. In other words, it is a whey in which no significant protein denaturation has occurred by heat treatment. When it is desired to retain low heat characteristics during the processing of such whey, care must be taken to avoid heating to such temperatures and for such holding times as may denature more than about 20% of the heat denaturable protein. For example, the whey may be heated to a temperature of 165° F. and held at that temperature for a period of 15 to 30 seconds, or it may be treated at a lower temperature (e.g. 130–165° F.) and holding times which may extend beyond 15 to 30 seconds, but again without significant denaturation of the protein. Assuming that heat treatment is applied preliminary to concentration by evaporation, the retention of low heat characteristics requires an evaporating process which of itself or in conjunction with preheating does not cause significant denaturation of protein. Thus a high velocity down-draft multiple effect evaporator of the Peebles type (Patent 2,090,985) may be used with the first effect having a jacket or shell temperature of about 165° F. corresponding to a whey temperature of 155° F. or less and with the retention time through the several effects being such as to avoid significant denaturation of protein. Comparable results can be obtained by using an up-draft vacuum evaporator provided the number of effects is limited to avoid significant denaturation. A high heat whey can be defined as one having about 80% or more of its heat denaturable protein in denatured form. For example, a high heat whey can be produced by heating to temperatures of the order of 180 to 260° F. or higher, with holding times of the order of one hour to 120 seconds. A medium heat whey is intermediate the low and high heat wheys and has about 10 to 80% of its denaturable protein in denatured form.

In the infant food industry there is need for a concentrate or dry product containing the solids of whey, but with a reduction in ash and lactose contents to provide protein levels of the order of from 20 to 30% or more. In many instances the protein content of such products must not have any significant amount of denaturation. There is also a demand for similar whey products in the ice cream and other food industries, although in such instances the protein content may be denatured to a substantial extent.

In general, it is an object of the present invention to provide a novel process for the manufacture of valuable food products from whey.

Another object of the invention is to provide a process of the above character which can be applied to the processing of low heat whey.

Another object of the invention is to provide a process of the above character which applies demineralization to liquid whey concentrate, with removal of lactose in subsequent treatment.

Another object of the invention is to provide a process of the above character which is featured by the removal of crystallized lactose from a concentrate after there has been a substantial reduction in the ash content.

Another object of the invention is to provide a process of the above character which can be carried out in such a manner as to produce low, medium and high heat whey products.

Another object of the invention is to provide novel high protein products resulting from the foregoing process.

Additional objects and features of the invention will appear from the following description in which the preferred embodiments of the invention have been disclosed in detail in conjunction with the accompanying drawing.

Referring to the drawing:

FIGURE 1 is a flow sheet illustrating my process; and

FIGURE 2 is a chart showing the relationship between low, medium and high heat wheys.

The whey employed as a source of material for my process is a low heat whey such as is derived from the manufacture of cheese, such as Cheddar cheese or cottage cheese whey. Generally, I prefer to use so-called sweet wheys, although it is possible to use acid wheys. Typical sweet wheys have hydrogen ion concentrations that may range from about pH 4.7 to 6.0. Typical acid wheys may range from about pH 3.9 to 4.2. The ash content of cottage cheese wheys may be of the order of from 10.0 to 11.5% (dry solids basis), and that of Cheddar cheese wheys from about 8.5 to 9.0%.

Referring to the flow sheet of the accompanying drawing, in step 10 the raw liquid whey is concentrated, as by preheating the whey and then passing it through several effects of a vacuum evaporator. The temperatures and retention times should be such that no significant protein denaturation occurs. In a typical instance the whey may be preheated to 155° F. for a holding period of the order of 120 seconds, and then passed through several effects of a vacuum evaporator, during which time the whey temperature does not exceed about 155° F. The resulting concentrate may have a solids content ranging from 20 to 30%. In step 11 the pH of the whey concentrate is adjusted to about pH 6.2 to 6.4, by introducing a suitable chemical such as lime, sodium hydroxide, or potassium hydroxide. Following pH adjustment the whey is subjected to clarifying in step 12, as by treating it in a suitable centrifugal clarifier. This serves to remove substantially insoluble material present, particularly insoluble protein or curd fragments.

In instances where the whey is being stored after being concentrated, it is reheated to about 110 to 120° F. before being clarified, to disholve fine lactose crystals that may be present.

In step 13 the clarified whey concentrate is subjected to electrodialysis. The equipment used for this purpose may be one or more membrane stocks with the whey flowing through ducts concurrently to a brine stream. Suitable equipment of this type is manufactured by Ionics, Inc. (see Patents 2,730,768, 2,731,411 and 2,800,445). I can advantageously use the elecetrodialysis method and equipment disclosed in copending application Ser. No. 404,658, filed Oct. 19, 1964.

The electrodialyzing step should be controlled with respect to pH and temperature to avoid precipitation of protein or gelation. Assuming that the whey entering the electrodialysis operation is at pH 6.2 to 6.4, it is desirable to control the applied voltage and current whereby during electrodialysis the pH will vary within a range of from about pH 6.2 to 4.7. The electrodialyzed whey leaving this step may in typical instances range from about pH 4.8 to 5.2. Electrodialysis is continued to produce the desired reduction in ash content. In general, electrodialysis may reduce the ash content from about 15 to 95%, a reduction of about 20 to 90% being preferred.

In step 14 the electrodialyzed liquid material is further concentrated preparatory to removal of a portion of its lactose content. Concentration may be carried out by vacuum evaporation to from 40 to 60% solids, after which lactose is permitted to crystallize in step 15, and lactose crystals removed in step 16. Assuming that it is desired to maintain the protein content in undenatured form, care is taken during concentration to avoid use of temperatures in excess of about 155° F. and in general to avoid such use of temperature and time retention factors as to cause significant denaturation. Crystallization can be carried out in any suitable conventional crystallizing equipment involving seeding and gradual cooling of the concentrate. Removal of the lactose crystals can be by conventional methods such as hydraulic separation, centrifugation, or screen reels.

The liquid material from step 16 is a concentrate indicated at 17, which can be used and sold as such. However, in most instances it is desirable to subject the liquid material from step 16 to further concentration by vacuum evaporation. This may be carried out in steps 18 or 19, which differ with respect to temperatures and holding times whereby low heat characteristics are maintained in step 18, or a high heat concentrate obtained in step 19. Concentration in either steps 18 or 19 may produce a concentrate containing 45 to 65% solids, which again can be sold and used as a concentrate 20, or may be subjected to spray drying at 21 to produce a discrete spray dried product 22.

Spray drying can be carried out by the use of conventional spray drying equipment wherein the liquid concentrate is atomized in a chamber where the atomized particles are dispersed in a drying gas (see Patent 2,088,606). Preferably the drying conditions maintained are such that the divided product discharged from the drying chamber has a moisture content of the order of from 12 to 18%. This moist discrete material is then subjected to secondary drying, as for example by the use of conventional tunnel dryers or dryers of the shaker type. The final product preferably has a moisture content of the order of from 4.0 to 6.0%.

The final dry product produced by the process described above is a relatively stable free-flowing powder. The ash content may range from about 1.5 to 15%, depending upon the extent of demineralization and the degree of lactose removal. The residual lactose content may range from about 35 to 70%, depending upon the amount of lactose in the original whey and the amount removed during processing. Assuming that all of the processing steps following electrodialyzing are carried out to avoid any significant denaturing of protein, then the protein content of the final product is substantially undenatured, and the product is well adapted to special dietetic purposes, such as use in formulating infant foods. However, for other uses, such as in ice cream mixes, the major portion of the heat-denaturable protein may be denatured. Assuming that demineralization is carried out to effect reductions in the ash content of from 15 to 95%, the dry product may contain about from 70 to 35% by weight of lactose, about 18 to 35% or more protein, an ash content of the order of from 1.5 to 15%.

In some instances it may be desirable to carry out removal of lactose in two or more steps. Thus concentrate from steps 18 or 19 may be treated in a further crystallizing step 23, with lactose crystals being removed in separating step 24. The final concentrate 25 may be used or sold as such, or may be subjected to spray drying in step 26 to produce a spray dried product 27.

My process has a number of advantageous features. Electrodialyzing is carried out on whey concentrate, thus ensuring good capacities. Pretreatment of the whey to remove insoluble protein and curd fragments prevents clogging of the equipment. The removal of a substantial part of the ash content before the crystallizing and separating operations facilitates lactose removal and makes possible a relatively high lactose yield. This is desirable in that it increases the protein content in the finished product. My process also greatly facilitates and is well-adapted to the treatment of low heat whey, and particularly low heat whey where the processing is carried out in such a manner as to produce a final product having substantially undenatured protein. The electrodialyzing operation 13 is less susceptible to clogging when the whey concentrate being electrodialyzed is of the low heat type.

Assuming that step 18 is employed, the processing described above is such that the protein remains undenatured throughout the processing steps. In some instances it is desirable to produce a product in which the protein is denatured. Thus the electrodialyzed whey from step 13 can be subjected to concentrating in step 31 with heat treatment such that 80% or more of the heat-denaturable protein is denatured. In other words, it may be subjected to temperatures of the order of 165° F. or higher, for periods of time sufficient to effect the desired extent of denaturation. Such heat treatment can be preliminary to concentration, or may be in conjunction with concentration. Also it may be in conjunction with effective heat sterilization. The concentrate from step 31 is shown being subjected to crystallizing in step 32, with lactose crystals being removed in step 33. Thereafter, the remaining liquid may be subjected to further concentrating at 34 to produce a concentrate containing from say 45 to 55% solids, which can then be sold or used as such, or subjected to spray drying in step 34 to produce the final dry product 36. A product produced in this manner has substantially the same characteristics and properties as a product produced by low heat treatment throughout, except for the denatured condition of the protein. Such products are desirable where the presence of denatured protein is an attribute rather than a detriment. Particular reference can be made to products suitable for use in ice cream mixes, or other specialized food products.

High heat products can also be obtained by employing step 19 to produce a high heat concentrate 20, or with drying 21 to form a dry product 22, or with steps 23 and 24 to reduce the lactose content and to form the concentrate 25 and/or with drying 26, the dry product 27.

Specific examples of my method and product are as follows:

EXAMPLE I

The source material used was raw fresh fluid Cheddar cheese whey. It was low heat in that there was no significant denaturation of the protein content. Also it was sweet whey in that the hydrogen ion concentration was about pH 5.8. The whey was passed through a preheater where it was rapidly heated to about 155° F. for a holding period of about 30 seconds. It was then concentrated to 28% total solids by passing it through a vacuum evaporator of the collandria type with three effects. During vacuum evaporation the whey was not heated to a temperature in excess of 155° F., and there was no significant denaturation of the protein content in the concentrate. After a storage period during which the concentrate was permitted to cool, the concentrate was preheated to 120° F., and the hydrogen ion concentration adjusted within the limits of about pH 6.2 to 6.4, by the addition of potassium hydroxide. The concentrate was then clarified by centrifuging in a bowl type intermittent unloading clarifier. This served to remove small quantities of insoluble suspended casein and whey protein substances. The concentrate was then electrodialyzed in a four-stack demineralizing plant (Ionics, Inc.) in a conventional manner. The electrodialyzing operation was controlled with respect to voltage and current to prevent heating above about 100° F. During electrodialyzing the pH was within the range of about 6.3 to 4.8. Electrodialyzing was continued to remove about 50% of the ash content. Thereafter the demineralized concentrate was further concentrated to about 61.4% total solids using a preheater and single effect evaporator, with temperatures and time factors controlled to prevent any significant protein denaturation. The concentrate was then heated to 155–158° F. and introduced into a water jacketed crystallizing tank. The concentrate was held in the crystallizing tank for two hours without substantial cooling but with agitation, after which cooling water was circulated through the jacket to gradually lower the temperature of the concentrate from 160° to 100° F., at a regular and even rate of decrease over a fourteen hour period. The concentrate together with lactose crystals of harvestable size was then fed to a basket centrifuge where lactose crystals were removed. The lactose yield was about 50% of the original quantity present. The partially delactosed and demineralized concentrate resulting after lactose removal was again concentrated to about 48% solids, using vacuum evaporating equipment of the Peebles type as in the first concentrating operation. Temperature and time factors were controlled to avoid any significant protein denaturation. This concentrate was then converted to an anhydrous dry powdered material by use of conventional drying equipment. The resulting dry product analyzed as follows:

| | Percent |
|---|---|
| Protein | 27.44 |
| Lactose | 58.60 |
| Ash | 8.42 |
| Moisture | 2.0 |

The crude lactose harvested in the above example was found to contain 97.25% lactose, 1.67% protein, and 0.55% ash.

While the concentrate in the foregoing example was spray dried to produce an anhydrous powder, for a commercial product it is preferable to employ a conventional hydrate type spray dryer with a secondary dryer as previously described to form a hydrate type product.

EXAMPLE II

The process was carried out in substantially the same manner as in Example I. However, the crystallizing operation was conducted to remove about 65% of the lactose present. The resulting product analyzed as follows:

| | Percent |
|---|---|
| Protein | 28.19 |
| Lactose | 56.68 |
| Ash | 8.62 |
| Moisture content | 2.10 |

Except for the difference in analysis of the final product, with a higher percentage of protein, the product produced in this example was generally the same as the product in Example I.

EXAMPLE III

The process was carried out in substantially the same manner as in Example I. However, the crystallizing and lactose separating operations were controlled to remove about 70% of the original quantity of lactose present. The resulting dry product analyzed as follows:

| | Percent |
|---|---|
| Protein | 30.17 |
| Lactose | 52.38 |
| Ash | 8.98 |
| Moisture | 2.0 |

This product likewise had characteristics similar to the product produced by Examples I and II except for the different analysis which provided an increased protein level.

EXAMPLE IV

The process was carried out as in Example I. However, the electrodialyzing was continued to effect about 90% ash removal, and about 60–65% of the lactose was removed. The dry anhydrous product analyzed as follows:

| | Percent |
|---|---|
| Protein | 30.2 |
| Lactose | 65.0 |
| Ash | 1.53 |
| Moisture | 1.5 |

As previously stated, the protein content of whey products produced by my process may range from 18 to 35%, depending upon the extent to which lactose and mineral salts are removed. Thus as a high protein dietetic material I may process whey to produce products in the order of 35% protein and 2.5% ash, with either low, medium or high heat characteristics with respect to denaturation of protein. As previously mentioned, about 55% of the protein present in whey is heat-denaturable. The amount of undenatured protein present depends upon the percentage of protein in the final product. This is shown in FIGURE 2, which is a chart in which protein, expressed in terms of whey protein nitrogen per gram of product, is charted against the percent protein in the final dry product. The upper line 1 represents about 20% denaturation of the heat-denaturable protein, and the lower line 2 about 80% denaturation. Therefore, the space above line 1 represents low heat range, the space below the line 2 high heat range, and the space intermediate lines 1 and 2 the medium heat range.

I claim:

1. In a process for the treatment of liquid whey, the whey having not less than about 80% of its heat-denaturable protein in substantially undenatured form, the steps of subjecting the whey to concentration without substantial denaturation of the heat-denaturable protein to produce a concentrate having a solids content of at least about 20%, subjecting the concentrate to clarification, subjecting the clarified whey concentrate to electrodialysis to effect a reduction of the order of 15% or more in the ash content of the same, maintaining the pH of the whey concentrate during electrodialysis within the range of about 6.2 to 4.7 and at a temperature not higher than about 100° F. whereby precipitation of protein or gelation during electrodialysis is avoided, concentrating the electrodialyzed material, and then removing lactose from the material, thereby producing a whey concentrate which is partially demineralized and delactosed, the amount of lactose removed being such as to provide a residual lactose content of from 35 to 70% (dry solids basis).

2. A process as in claim 1 in which the protein content of the electrodialyzed material, after electrodialysis but before removal of lactose from the same, is subjected to heat treatment to effect denaturing of the heat-denaturable protein to such an extent that less than 80% of the original heat-denaturable protein is in undenatured form.

3. In a process for the treatment of liquid whey for the manufacture of a dry product, the steps of subjecting raw liquid whey having at least 80% of its heat-denaturable protein in undenatured form to concentration by evaporation to produce a concentrate having a solids content of at least about 20% without substantial denaturation of the heat-denaturable protein content, adjusting the concentrate to pH 6.2 to 6.4, subjecting the concentrate to clarifying by centrifuging, subjecting the concentrate to electrodialysis to effect a reduction of ash content of from 15 to 95%, maintaining the pH of the whey concentrate during electrodialysis within the range of about 6.2 to 4.7 and at a temperature not higher than about 100° F. whereby precipitation of protein or gelation during electrodialysis is avoided, further concentrating the demineralized material, effecting crystallization of lactose, removing lactose crystals from the remaining liquid material to provide a residual lactose content of from 35 to 70% (dry solids basis), further concentrating the remaining liquid material, and then subjecting the material to spray drying to form a dry product.

4. A method as in claim 3 in which the steps of the process following electrodialyzing are carried out without substantial denaturation of heat-denaturable protein.

5. A method as in claim 3 in which treatment of the liquid material after electrodialyzing and before removal of lactose is carried out under conditions of temperatures and retention times to effect denaturation of the heat-denaturable protein whereby not more than about 20% of the heat-denaturable protein is in undenatured form.

6. In a process for the treatment of liquid whey concentrate having a solids content of the order of from 20 to 30% and having not less than about 80% of its heat denaturable protein in substantially undenatured form, the steps of subjecting the concentrate to clarification, subjecting the clarified whey concentrate to electrodialysis to effect a reduction of the order of 15% or more in the ash content of the same, maintaining the pH of the whey concentrate during electrodialysis within the range of about 6.2 to 4.7 with the concentrate at a temperature not higher than about 100° F. whereby precipitation of protein or gelation during electrodialysis is avoided, concentrating the electrodialyzed material and then removing lactose from the material, thereby producing a whey concentrate which is partially demineralized and delactosed, the amount of lactose removed being such as to provide a residual lactose content of from 35 to 70% (dry solids basis).

7. A process as in claim 6 in which the liquid whey after electrodialysis is subjected to heat treatment to effect some denaturation of heat denaturable protein before the lactose is removed.

8. A process as in claim 6 in which the steps following electrodialyzing are carried out without substantial denaturation of heat denaturable protein.

References Cited

UNITED STATES PATENTS 2,631,100   3/1953   Aten et al. _____ 99—57
2,758,965   8/1956   Block et al.

LIONEL M. SHAPIRO, *Primary Examiner.*

D. M. NAFF, *Assistant Examiner.*

U.S. Cl. X.R.

204—180